United States Patent [19]

Gunyuzlu

[11] Patent Number: 5,039,368
[45] Date of Patent: Aug. 13, 1991

[54] THERMOPLASTIC MATRIX FILAMENT WINDING HEAD

[75] Inventor: Mark A. Gunyuzlu, Charlotte, N.C.

[73] Assignee: Thiokol Corporation, Ogden, Utah

[21] Appl. No.: 411,835

[22] Filed: Sep. 25, 1989

[51] Int. Cl.⁵ .......................................... B65H 81/00
[52] U.S. Cl. ................... 156/175; 156/322; 156/429; 156/431
[58] Field of Search ............ 156/169, 172, 173, 175, 156/180, 188, 189, 190, 195, 320, 322, 425, 429, 430, 431

[56] References Cited

U.S. PATENT DOCUMENTS

| | | | |
|---|---|---|---|
| 1,883,401 | 10/1932 | Rolfs et al. | 156/428 |
| 3,379,591 | 4/1968 | Bradley | 156/173 |
| 3,477,891 | 11/1969 | Hawerkamp | 156/173 |
| 3,573,123 | 3/1971 | Siegel et al. | 156/171 |
| 3,617,415 | 11/1971 | Hawerkamp | 156/172 |
| 3,715,252 | 2/1973 | Fairbairn | 156/173 |
| 4,010,054 | 3/1977 | Bradt | 156/173 |
| 4,569,716 | 2/1986 | Pugh | 156/523 |
| 4,750,960 | 6/1988 | Bubeck | 156/169 |
| 4,790,898 | 12/1988 | Woods | 156/166 |
| 4,797,172 | 1/1989 | Hebert et al. | 156/425 |
| 4,822,444 | 4/1989 | Weingart et al. | 156/175 |
| 4,851,065 | 7/1989 | Curtz | 156/172 |
| 4,877,193 | 10/1989 | Vaniglia | 156/574 |
| 4,909,880 | 3/1990 | Kittelson et al. | 156/189 |

OTHER PUBLICATIONS

Youngs, "Advanced Composite Thermoplastics: A New Structural Material", Society of Plastics Engineers 43rd Annual Technical Conference Proceedings, Apr. 20–May 2, 1985, pp. 1181–1183.

Primary Examiner—Michael W. Ball
Assistant Examiner—Steven D. Maki
Attorney, Agent, or Firm—Ronald L. Lyons

[57] ABSTRACT

Thermoplastic matrix composite cylinders, pipes, and other hollow bodies are formed by a winding technique using thermoplastic filaments. The filaments are fed from a vertically moving winding head onto the surface of a rotating mandrel. The filaments are preheated to soften them and then pass beneath a heated compaction roller bearing against the mandrel. The compaction roller is castered so as to follow a helical path. Several plies of the thermoplastic material may be laid down in this fashion, the surface of each prior ply being heated so that the layers fuse properly. When cooled to below its solidification temperature, the formed object is removed from the mandrel.

14 Claims, 3 Drawing Sheets

THERMOPLASTIC MATRIX FILAMENT WINDING HEAD

The United States Government has rights in this invention pursuant to Prime Contract No. N00024-85-C-5546 awarded by the U.S. Navy.

TECHNICAL FIELD

The field of this invention pertains to the fabrication by hoop winding of thermoplastic matrix composite cylinders, pipes, and similar products such as pressure vessels or rocket motor cases.

BACKGROUND ART

Advanced thermoplastic matrix composites have many advantages which make them particularly useful in the aerospace industry. However, in order to take full advantage of their potential, they must also be cost competitive with competing materials. Competing materials are generally of the thermosetting type. If thermoplastic matrix composites could be fabricated at significantly higher production rates than their thermosetting counterparts, as by increased automation, the desired cost competitiveness could be achieved. One way of achieving this objective would be to wind the part from rovings preimpregnated with the desired thermoplastic matrix. However, until this invention, such rovings have been generally impossible to wind by conventional methods. Accordingly, it is a primary object of the present invention to provide improved method and apparatus for forming useful structures from thermoplastic filaments, employing winding techniques. Other objects, features, and advantages will become apparent from the following description and appended claims.

DISCLOSURE OF INVENTION

An article is formed from a thermoplastic material by providing a mandrel having a rotational axis and a forming surface substantially enclosing the rotational axis. A filament, or roving, incorporating the desired plastic material is wrapped onto the surface of the rotating mandrel beneath a heated compaction roller which casters and is forced against the rotating surface of the mandrel. The compaction roller travels slowly vertically along the mandrel in a direction parallel to the mandrel's axis of rotation. The filament is heated and softened as it passes between the rotating surfaces of the mandrel and compaction roller and is thereby helically wrapped onto the outer surface of the mandrel to form a hollow body. Thereafter, the hollow body is cooled and removed from the mandrel.

BEST MODE FOR CARRYING OUT THE INVENTION

Figure 1:
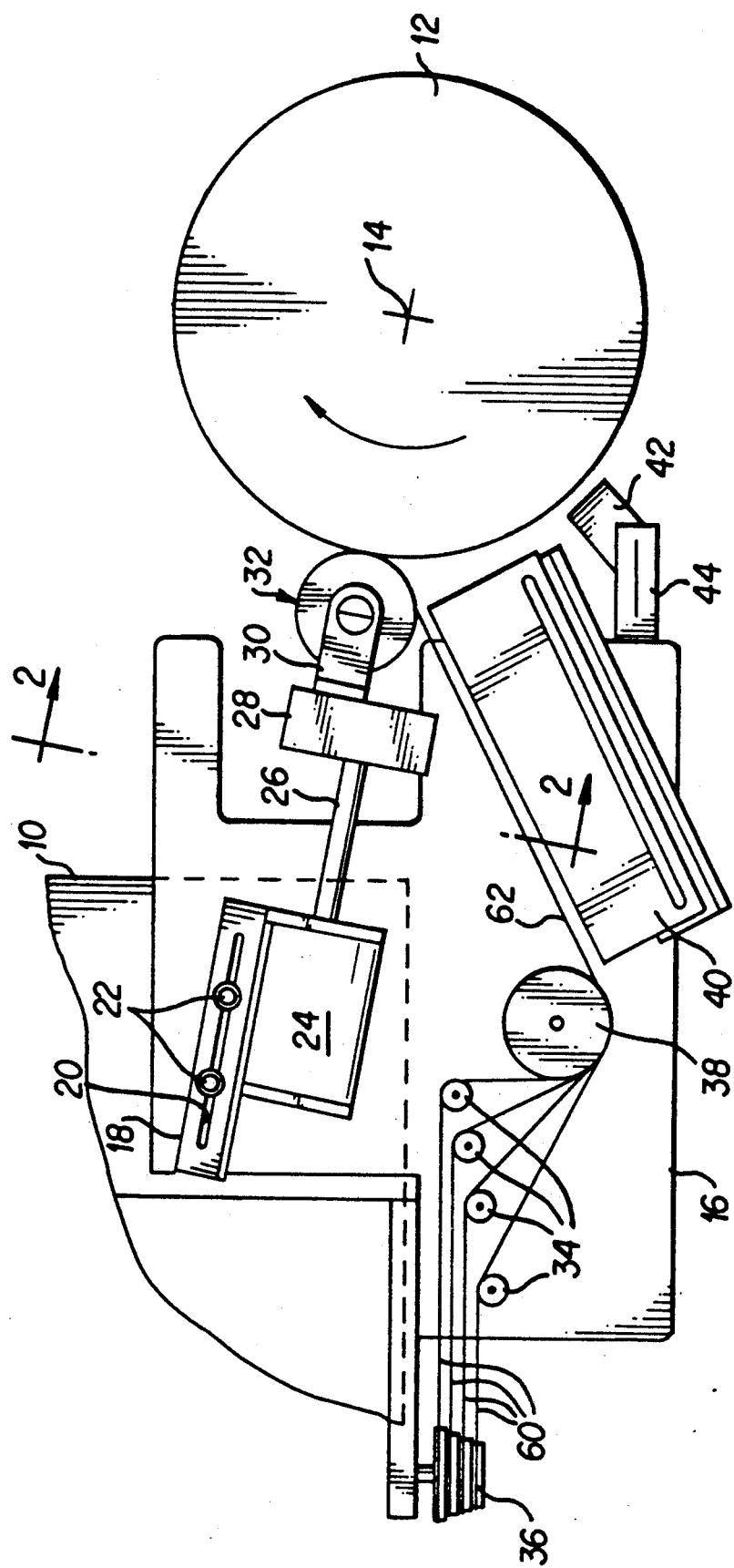
FIG. 1 is a plan view of the winding head mechanism of this invention, shown positioned against a rotating mandrel.

The method of this invention may be performed by the winding head illustrated in the drawings, mounted on the carriage 10 of a standard commercial filament winding machine. Carriage 10 moves vertically relative to a mandrel 12 which, in the illustrated embodiment, is cylindrical and rotates about a vertical axis of rotation 14. The outer surface of the mandrel 12 constitutes a forming surface upon which is formed the object being wound. In the illustrated embodiment, this surface is a body of revolution about axis of rotation 14. However, the surface could be irregular to some extent. Also, the surface could be conical or tapered to accommodate the construction of shapes such as rocket motor casings.

The winding head assembly comprises a base plate 16 which is secured to the winding machine carriage 10. An angle iron bracket 18 is adjustably mounted on the base plate 16 by slot 20 and screws 22. An air cylinder 24 is carried by the bracket 18. A piston rod 26 extends horizontally outward from the air cylinder 24 in the direction of the mandrel 12 and carries on its end a cylindrical bearing assembly 28. Bearing assembly 28 rotates freely around the axis of the piston rod 26 and carries a pair of spaced mounting brackets 30. The brackets 30 are mounted off center of the axis of rotation of the cylindrical bearing 28 and the axis of the piston rod 26. Mounted between the brackets 30 is a compaction roller assembly 32 which will be described in more detail below.

Also carried by the base plate 16 are a plurality of positioning rollers 34, mounted for rotation about vertical axes and aligned with the respectively different diameters of a stepped pulley 36 on the winding machine. Also carried by the base plate 16, is a smooth cylindrical roller 38 which is also mounted for rotation about a vertical axis.

Extending along the "run" between cylindrical roller 38 and compaction roller 32 is a parallel ray, infrared strip heater 40. A mandrel surface heater 42 is supported adjacent the surface of the mandrel 12 by a bracket 44 carried by base plate 16.

Figure 3:
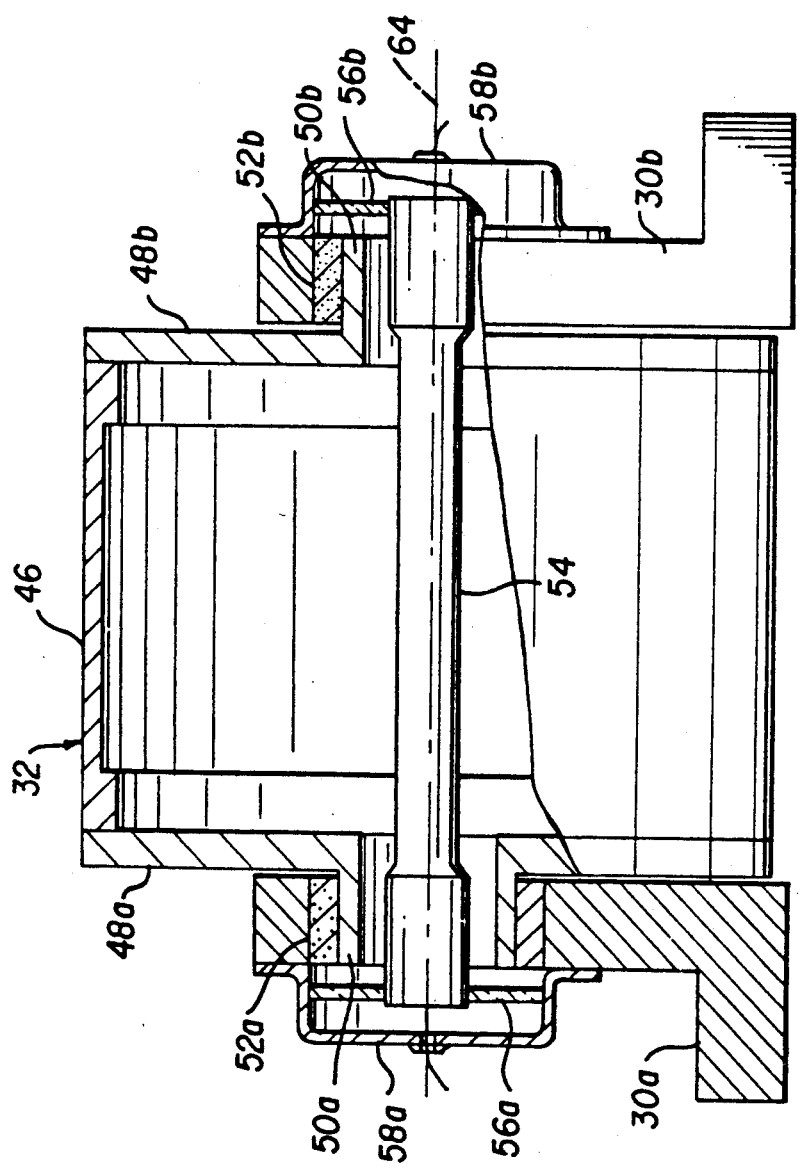
FIG. 3 is an enlarged partial cross-sectional view of the compaction roller portion of the winding head.

Turning now to FIG. 3, the compaction roller assembly 32 will be described in more detail. The compaction roller 32 comprises a cylindrical body 46, the open ends of which are closed by identical side plates 48a, 48b. Each of the side plates 48 includes a centrally positioned, outwardly extending hub 50a, 50b. The hubs 50 are mounted for rotation in high temperature, copper-impregnated, graphite bushings 52a, 52b, carried by the respective mounting brackets 30.

Centrally mounted within the hubs 52, so as to extend axially through the compaction roller 32, is a high heat flux halogen cycle lamp 54. The ends of the lamp 54 are supported by electrically insulated stand-off brackets 56a, 56b positioned within hub caps 58a, 58b.

In operation, a plurality of fiber rovings, or filaments, 60 are fed from tensioning devices (not shown) on the winding machine over the stepped pulley 36 and the positioning rollers 34. The rovings are gathered side by side into a band 62 on the cylindrical roller 38. The band 62 passes along the strip heater 40 which acts as a pre-heater to soften the thermoplastic matrix and also remove some of any moisture which has been absorbed from the atmosphere. The band 62 then passes between the compaction roller 32 and the rotating mandrel 12.

The compaction roller 32 is heated by the internal lamp 54 previously described. The heated compaction roller 32 has a surface release coat that is stable up to the required processing temperature. The compaction roller 32 is forced against the band 62 and the forming surface of the mandrel 12 by the air cylinder 24. As shown by the arrows on FIG. 2, the winding head moves slowly downward as the mandrel 12 rotates. Consequently, the band 62 is laid helically onto the forming surface of the mandrel 12 at a slight angle (exaggerated in FIG. 2).

Figure 2:
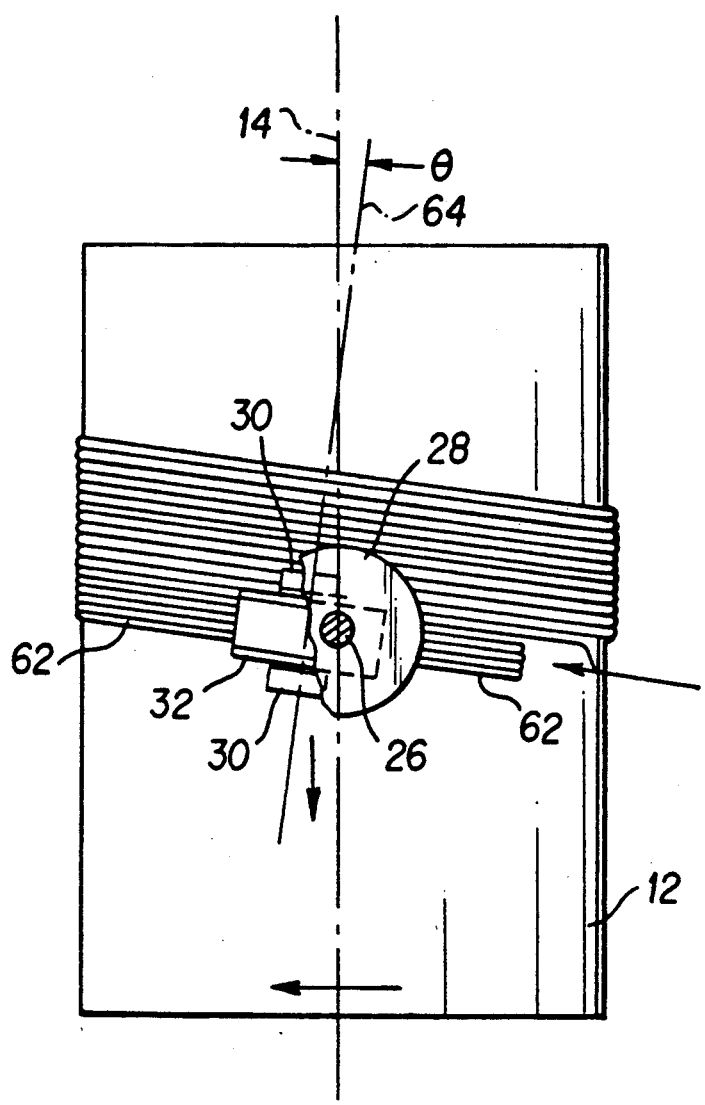
FIG. 2 is a cross-section, taken substantially along the line 2—2 of FIG. 1, with the mandrel shown vertical, portions thereof being broken away to illustrate the internal construction.

As has been previously noted, the bearings 30 supporting the compaction roller 32 are mounted on the cylindrical bearing assembly 28 and are offset so that the compaction roller 32 is displaced from the axis of the piston rod 26. As a result, a natural castering action occurs which is induced by the rotation of the mandrel 12 coupled with the vertically downward motion of the winding head imparted by the carriage 10. As a result, the axis of rotation 64 of the compaction roller 32, is shifted out of parallel with the axis of rotation 14 of the mandrel 12 by the angle θ, as shown in FIG. 2.

The speed of rotation of the mandrel 12 and the velocity of the downward motion of the winding head are adjusted so that the band 62 is wrapped against itself as it continues to encircle the mandrel 12. In this manner, a cylinder, pipe, rocket casing, etc. may be built up on the mandrel in the form of a single layer, or ply. Thereafter, the process may be repeated to form an object having multiple plies. When applying the second and subsequent plies, the surface of the previous ply is heated just prior to the laying down of the band 62 by the compaction roller 32. This is achieved by means of the heater 42 which thereby insures adequate fusion between plies of the composite during the fabrication process.

The mandrel 12 is provided with a suitable surface release coating prior to the beginning of the winding process. It thereby permits removal of the newly formed object following cooling to below its solidification temperature.

It is believed that the many advantages of this invention will now be apparent to those skilled in the art. It will also be apparent that a number of variations and modifications may be made therein without departing from its spirit and scope. Accordingly, the foregoing description is to be construed as illustrative only, rather than limiting. The invention is limited only by the scope of the following claims.

What is claimed is:

1. The method of forming a hollow body from a thermoplastic material which comprises:
   providing a mandrel having a first rotational axis and a forming surface substantially enclosing said first rotational axis;
   providing at least one filament incorporating said thermoplastic material;
   providing a natural-castering compaction roller positioned to bear and rotate against the forming surface of said mandrel and having a second rotational axis alignable by rotation of the mandrel slightly out of parallel with the first rotational axis of the mandrel;
   wrapping said filament onto the forming surface of said mandrel by relative rotation between said mandrel and compaction roller, said filament passing between the rotating surfaces of said mandrel and compaction roller;
   heating said compaction roller to thereby heat said filament between said rotating surfaces, whereby said filament is helically wrapped onto the forming surface of said mandrel to form a single ply hollow body; and
   removing the hollow body from said mandrel.

2. The method of claim 1 wherein a plurality of filaments are provided and passed between said rotating surfaces in substantially side-by-side relationship.

3. The method of claim 2 including the step of preheating said filaments to soften them prior to passing between said rotating surfaces.

4. The method of claim 1 wherein the heating and winding steps are repeated prior to removing the hollow body from the mandrel to thereby form a multiple ply body.

5. The method of claim 4 wherein each ply is heated prior to the formation of a successive ply to ensure adequate fusion between plies.

6. The method of claim 5 wherein a plurality of filaments are provided and passed between said rotating surfaces in substantially side-by-side relationship.

7. The method of claim 6 including the step of preheating said filaments to soften them prior to passing between said rotating surfaces.

8. Apparatus for forming a hollow body from at least one filament of a thermoplastic material which comprises:
   a mandrel rotatable about a first axis of rotation and having a forming surface substantially enclosing said first axis of rotation;
   a natural-castering compaction roller pressing against the forming surface of the mandrel to form a nip and rotatable by the mandrel about a second axis of rotation slightly out of parallel with the first axis of rotation;
   means for translating said compaction roller relative to the forming surface of the mandrel along a path lying in a plane containing said first axis of rotation to thereby describe a helical path along the mandrel forming surface as the compaction roller rotates against the forming surface of said mandrel;
   means for feeding said filament into the nip between the compaction roller and mandrel forming surface to wrap about said mandrel along said spiral path; and
   heating means within said compaction roller for heating and softening said filament in said nip.

9. The apparatus of claim 8 wherein said translating means comprises:
   a bearing assembly having a third axis of rotation substantially perpendicular to said first axis of rotation; and
   means for mounting said compaction roller off center of said third axis of rotation whereby said compaction roller casters as it rolls along said spiral path.

10. The apparatus of claim 8 including means for preheating said filament prior to entering the nip.

11. The apparatus of claim 8 including means for heating a region of the hollow body on the surface of the mandrel prior to its engagement with the compaction roller.

12. The apparatus of claim 8 wherein the filament feeding means feeds a plurality of filaments in substantially side-by-side relationship.

13. The apparatus of claim 10 including means for heating a region of the hollow body on the surface of the mandrel prior to its engagement with the compaction roller.

14. The apparatus of claim 13 wherein the filament feeding means feeds a plurality of filaments in substantially side-by-side relationship.

* * * * *